United States Patent [19]
Beshah

[11] Patent Number: 5,960,513
[45] Date of Patent: Oct. 5, 1999

[54] AUTOMOBILE WINDOW WASHER FLUID RESERVOIR AND DISPENSER

[76] Inventor: Paul Beshah, 7719 W. 22nd St., St. Louis Park, Minn. 55426

[21] Appl. No.: 08/941,570

[22] Filed: Sep. 30, 1997

[51] Int. Cl.⁶ ............................................. A46B 17/00
[52] U.S. Cl. ........................ 15/257.01; 15/1; 137/571
[58] Field of Search .................. 15/257.01, 257.05; 47/40.5; 222/129, 185.1; 141/391; 137/255, 572; 210/455, 465, 477, 488; 55/357, 495

[56] References Cited

U.S. PATENT DOCUMENTS

| | | | |
|---|---|---|---|
| 935,006 | 9/1909 | Field | 137/255 |
| 1,174,660 | 3/1916 | Blickman | 137/255 |
| 3,849,312 | 11/1974 | Wecker, Sr. | 210/455 |
| 4,143,792 | 3/1979 | Rex | 15/227.05 |
| 4,247,316 | 1/1981 | Putman | 55/357 |
| 4,765,359 | 8/1988 | Burnett | 137/255 |
| 4,930,252 | 6/1990 | Krause et al. | 47/40.5 |
| 5,157,868 | 10/1992 | Munoz | 47/40.5 |
| 5,190,653 | 3/1993 | Herrick et al. | 210/477 |
| 5,201,140 | 4/1993 | Voorhis | 47/40.5 |
| 5,490,350 | 2/1996 | Eisenschenk et al. | 47/40.5 |
| 5,513,677 | 5/1996 | McCurry | 141/391 |

*Primary Examiner*—Mark Spisich
*Assistant Examiner*—Theresa T. Snider
*Attorney, Agent, or Firm*—Janet Peyton Schafer

[57] ABSTRACT

A pump-free automobile window washer system for providing a continuous supply of window washer fluid for use with a window washing squeegee. The window washer system has a reservoir tank with a lid, which may be locked in place, and, at least one dispenser, having a lid which may be locked in place with an aperture formed therein for receipt of automobile window washing squeegee. The reservoir and dispenser are interconnected by tubing. A filter is positioned within the dispenser for removing impurities from the window washer fluid contained in the dispenser, the filter may be removed for cleaning and replaced within dispenser.

11 Claims, 2 Drawing Sheets

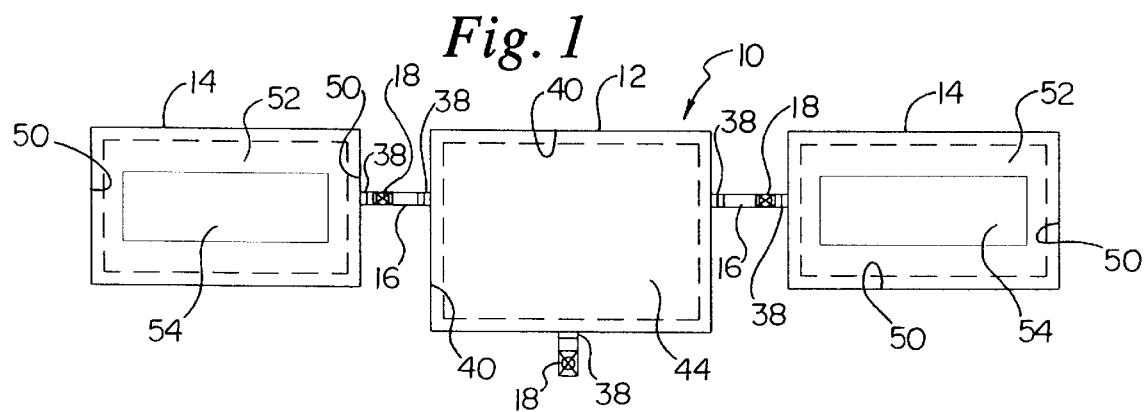
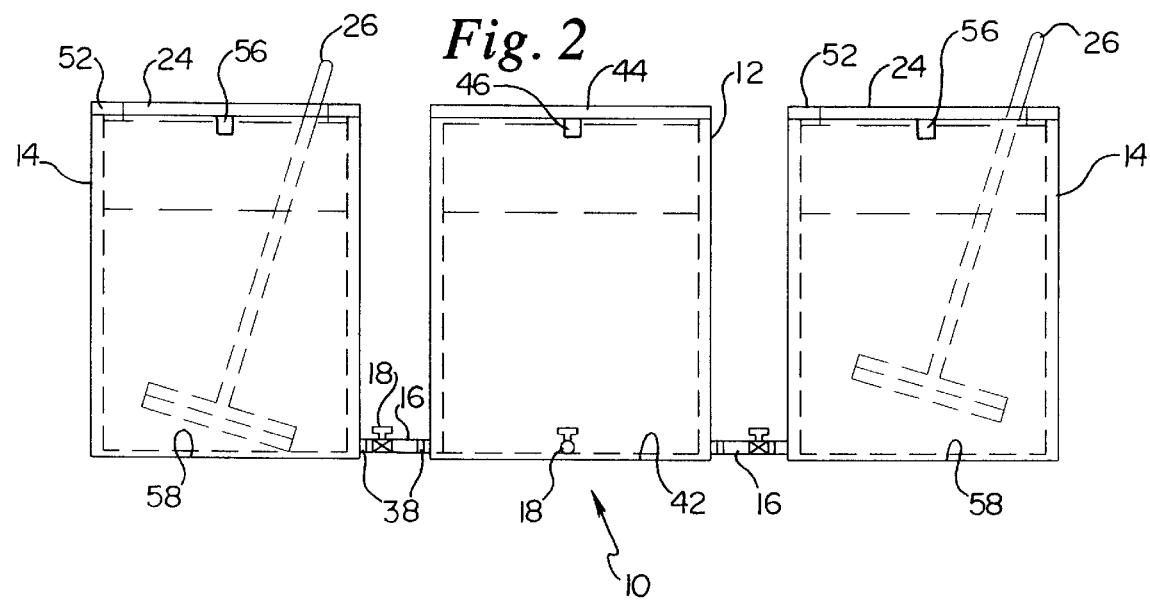

AUTOMOBILE WINDOW WASHER FLUID RESERVOIR AND DISPENSER

BACKGROUND

This invention relates generally to automobile window washing apparatus and more particularly to apparatus for providing a reservoir for continuously dispensing windshield washer fluid to a dispenser adjacent a fuel pump station.

It is important for safety reasons, especially during winter months in cold climates, to maintain a clean windshield and other windows on automotive vehicles. Washer fluid dispensers have been provided at service station islands as a receptacle for a squeegee and container for washer fluid enabling a customer to apply washer fluid to an automotive vehicle by means of wetting the squeegee in the fluid and transferring the fluid to the window to be washed. A problem with prior art window washing dispensers used at service station islands is that they frequently run out of window washing fluid. It is time consuming and expensive to periodically manually fill each individual dispenser with window washing fluid. The result of unfilled dispensers is irritation of the customers with possible loss of their custom. A further problem is the dirt and debris that accumulates in the known dispenser, muddying the washer fluid.

Prior fluid dispensers have been provided that are adapted to include a pump for dispensing fluids. Others teach bulk fluid dispensing of metered quantities of liquids. None of these provide means for a continuous supply of washer fluid to the dispenser in a manner requiring little employee time, making this system of dispensing more economical than the prior dispensers. Additionally, none of the prior art dispensers provide means for cleaning of the washer fluid within the dispenser.

While these prior art units may be suitable for the particular purpose to which they address, they would not be as suitable for the purposes of the present invention as herein described.

SUMMARY

The present invention is directed to an automobile window washer fluid reservoir and dispenser that satisfies these needs for a continuous washer fluid supply provided to dispensers in a quick, economical manner and with impurity removing means. An automobile window washer fluid reservoir and dispenser having features of the present invention comprises a pump-free automobile window washer system for use with a window washing squeegee, having a reservoir, and at least one dispenser with a lid having an aperture formed therein for receipt of an automobile window washing squeegee. Tubing interconnects the reservoir and dispenser.

A second embodiment provides an automobile window washer fluid reservoir and dispenser having a reservoir interconnected by tubing to at least one dispenser, the dispenser having a lid with an aperture formed therein for receipt of an automobile window washing squeegee and means to remove impurities from the window washer fluid retained within the dispenser. At least one shut-off valve is positioned on the interconnecting tubing for temporarily stopping fluid flow between the reservoir and the dispenser. The impurity removing means further comprises a slotted platform with the impurity removing means further comprising a filter supported by the slotted platform.

Another embodiment has a reservoir, with a shut-off valve, interconnected by tubing to a dispenser, having a shut-off valve with impurity removing means comprising a slotted platform having a handle formed centrally thereof, and a filter, having an aperture formed centrally therein for receiving the handle of the slotted platform. Fastening means attaches the filter to the platform, the fastening means including hook and loop fastener type fasteners mounted on both the filter and the platform. A flange is positioned on opposite side walls of the dispenser for supporting the platform. Additional dispensers, connected by additional tubing each with a shut-off valve attached, are positioned in fluid communication with the reservoir, with additional shut-off valves affixed to the reservoir.

A pump-free automobile window washer system for providing a continuous supply of window washer fluid for use with window washing squeegee, having a reservoir with a removable, lockable lid, at least one dispenser having a lid with an aperture formed therein for receipt of automobile window washing squeegee interconnected to the reservoir by tubing having a shut-off valve positioned on the tubing for temporarily stopping fluid flow between the reservoir and dispenser, and impurity removing means for cleaning the window washer fluid within the dispenser. The impurity removing means include a slotted platform, having a handle formed centrally thereof, and a filter, having an aperture formed therein for receiving the handle for mounting on the platform.

An advantage of this invention is that it supplies a continuous supply of washer fluid to the washer fluid dispenser. A further advantage of this invention is that it permits less frequent filling of the dispensers, enabling more economic use of employee time. An additional advantage is the removal of impurities from the washer fluid.

BRIEF DESCRIPTION OF THE DRAWINGS

Understanding of the invention will be enhanced by referring to the accompanying drawings, in which like numbers refer to like parts in the several views and in which:

FIG. 1 is a top plan view of the automobile window washer fluid dispenser and reservoir with two satellite dispensers attached to a centrally located reservoir in accordance with one embodiment of the invention;

FIG. 2 is a side plan view of FIG. 1 with squeegees shown in phantom;

DETAILED DESCRIPTION OF THE CURRENTLY PREFERRED EMBODIMENTS

Figure 3:
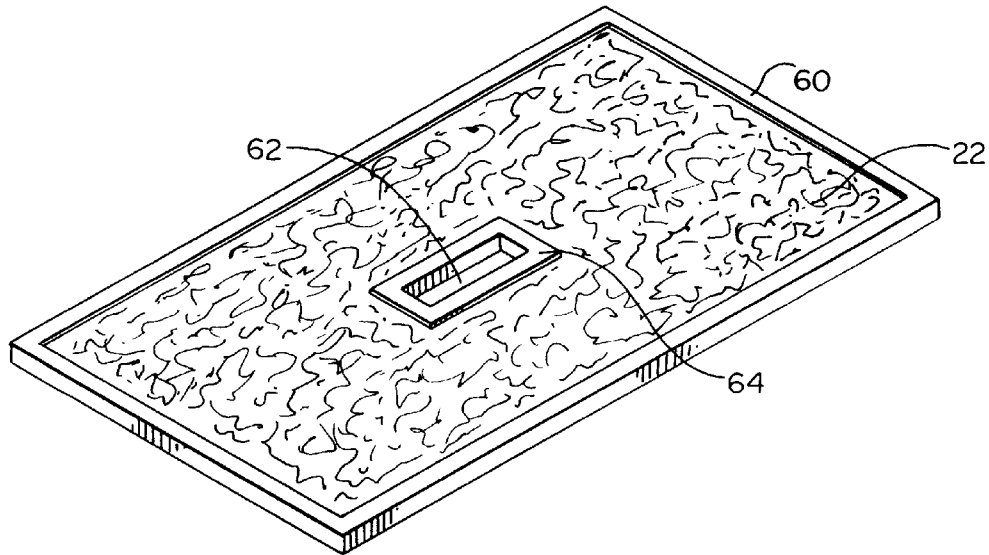
FIG. 3 is a perspective view of the filter.

Understanding of the invention will be further enhanced by referring to the following illustrative but nonlimiting example.

Turning now to the drawings, in which like reference characters refer to corresponding elements throughout the several views, FIG. 1 illustrates a first embodiment of an automobile window washer fluid dispenser and reservoir 10 having a reservoir 12 in fluid communication, by means of tubing 16, with at least one dispenser 14. A stopcock 18 or shut-off valve is positioned adjacent bottom edge of reservoir 12 and dispenser 14 and receives tubing 16 interconnecting reservoir 12 and dispenser 14. Each dispenser 14 has a centrally located opening 24 for removable receipt of a squeegee 26, as shown in FIG. 2.

Figure 4:
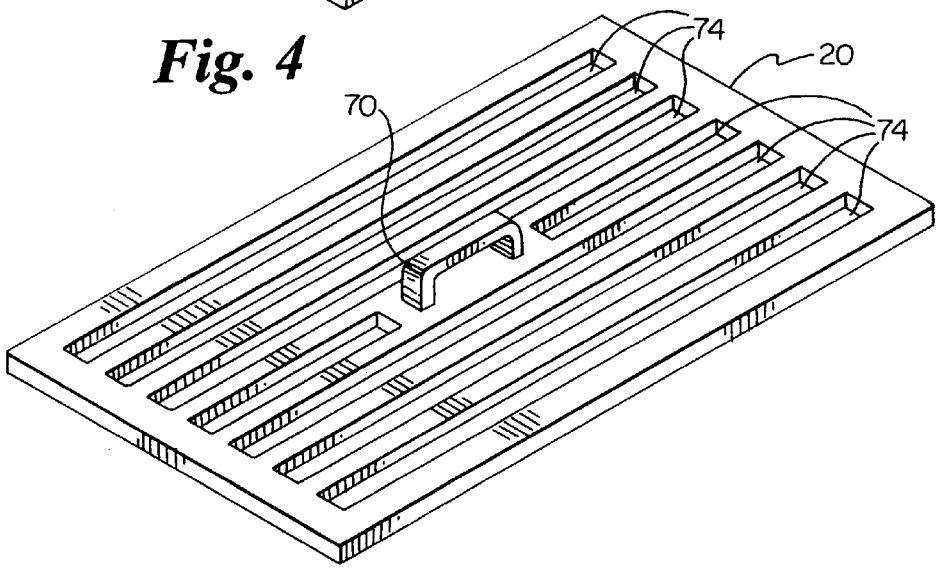
FIG. 4 is a perspective view of the platform which receives the filter.
Figure 5:
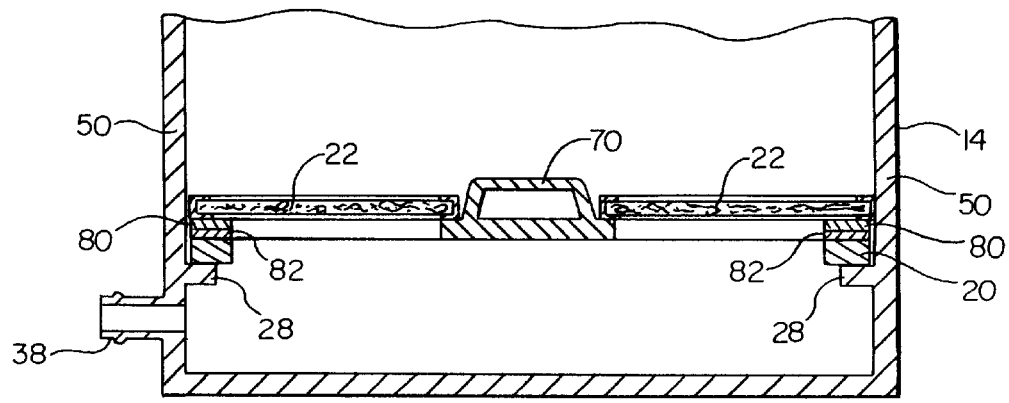
FIG. 5 is a partial plan view of the bottom of the dispenser with the filter and platform in place in accordance with one embodiment of the invention.

A second embodiment, shown at FIGS. 3–5, adds the feature of a slotted platform 20, supported by a flange 28 formed in at least two sidewalls of dispenser adjacent bottom edge. Platform 20 receives filter 22 which acts to collect impurities from the washer fluid for their eventual removal. FIG. 4 shows platform 20 having slots 74 formed therein.

As shown in FIG. 1, reservoir 12, is rectangular in shape although containers of other shapes, such as round, square, polygonal or irregular shapes, including step-shaped containers, could be used. Reservoir 12 has side walls 40 and bottom wall 42 and lid 44 which may be secured by lock 46 or other fastener. In actual use conditions, reservoir 12 is formed of rigid plastic although other materials, including metal, ceramics and other plastics could be used. Reservoir 12 is used as a container for holding a reserve supply of washer fluid, feeding washer fluid through tubing 16 to dispenser 14 as needed. Gravity acts to automatically move fluid from reservoir 12 through tubing 16 to dispenser 14 unless stopcock 18 is manually closed. An outlet 38, of rigid materials such has hard plastic, is fixedly attached adjacent bottom wall 42 in side wall 40 of reservoir 12. Outlet receives stopcock 18. Additional outlets 38 may be attached to reservoir 12 when more than one dispenser 14 is used. Tubing 16 is attached at a first end to outlet 38 and at a second end to dispenser 14. Tubing 16 is of flexible materials such as a garden hose, or may be of rigid materials such as PVC. Stopcock 18, positioned within outlet 38, permits closing off of tubing, an important feature if either reservoir 12 or dispenser 14 is damaged to the extent a leak of washer fluid occurs. By closing stopcock 18, large quantities of washer fluid is not lost. Additionally, having outlet 38, which may be plugged, positioned adjacent the bottom edge 58 of dispenser 14 and bottom wall 42 of reservoir, enables easy cleaning of the empty container by flushing out container with water.

Dispenser 14 has four side walls 50 and is shaped similarly as reservoir 12. Dispenser 14 has a removable cap 52 with an aperture 54, formed centrally therein, sized to receive a conventional squeegee 26. Cap 52 may be fixed to dispenser 14 by fastening means such as a lock 56. Dispenser 14 also has an outlet 38 fixedly attached to dispenser 14 adjacent a bottom edge thereof.

A second embodiment contains the additional elements of an impurity removing feature provided by a filter 22, of fiberglass materials with a fixed edge 60 surrounding the perimeter of filter 22 sized and shaped to be received by dispenser 14. The fixed edge 60 imparts strength and shape to filter 22. Fastening means attaches the filter 22 to the platform 20, the fastening means include hook 80 and loop 82 type fasteners mounted on both filter 22 and platform 20 as shown in FIG. 5. As shown, filter 22 is rectangular in shape but could be any size and shape so long as it fits inside dispenser 14. In actual use conditions, formed centrally in filter 22 is an opening 62 which has a fixed edge 64 associated therewith to stabilize filter 22 around opening 62, although any generally flat filter 22 with or without a central opening could be used. Filter 22 is positioned within dispenser 14 near the bottom wall 58 to catch sand and other debris, not shown, as it settles toward the bottom of dispenser 14. Periodically, i.e. when the fluid level in reservoir 12 and dispensers 14 is low, filter 22 can be temporarily removed from dispenser 14 and flushed with water to clean filter 22. Filter 22 is then replaced within dispenser 14 to again receive sand and other debris as it settles toward the bottom wall 42 of dispenser 14. In this manner, dispenser 14 may be cleaned prior to refilling with washer fluid without the inconvenience of disconnecting dispenser 14 from tubing 16 for flushing of dispenser 14.

Slotted platform 20 supports filter 22 within dispenser 14. Platform 20, in actual use conditions of rigid plastic but could be made of other materials such a ceramic or metal, has a handle 70 for easy removal of platform 20 and filter 22 for cleaning of filter 22 and dispenser 14. Platform 20 is positioned above bottom edge 58 by flange 28, formed in at least two side walls 50 of dispenser 14, to prevent squeegee 26 from touching the bottom edge 58 of dispenser 14 thereby preventing squeegee 26 from picking up particulate material that may be found adjacent the bottom edge 58. A second platform, not shown, could be positioned above filter 22 to prevent contact of squeegee 26 and dirty filter. FIG. 4 illustrates platform 20 having slots 74 formed therein.

In use, automobile window washer fluid dispenser and reservoir 10 is filled with window washer fluid poured into the reservoir 12, of a capacity greater than that of dispenser 14, to a level near lid 44 and each dispenser 14 to a level near cap 52. As the fluid is used by service station consumers to wash automobile windshields and other windows or lights, reservoir maintains an adequate level of fluid in all dispensers 14. In actual use conditions, reservoir 12 is of a capacity twice as great as is dispenser 14. Because reservoir 12 provides a storage area for washer fluid, less frequent filling of reservoir 12 and dispensers 14 is required thereby saving employee time and providing an economic benefit to the service station owner. Additionally, because the dispensers 14 are continuously fed by reservoir 12, customers are faced less often with the problem of empty washer dispensers 14. Also, having impurities removed from the washer fluid prevents inadvertent damage to the customers' windshields. Anytime, but especially when the washer fluid levels are low, prior to filling reservoir 12 and dispensers 14, filter 22 may be manually removed and flushed with clean water to removed impurities therefrom, filter 22 is then in replaced within dispenser 14 atop platform 20. Platform 20, in addition to supporting filter 22, prevents entry of particulate-laden squeegee 26 into relatively clean fluid adjacent the bottom edge 58 of dispenser 14. The particulate material on squeegee 26 washes off in the washer fluid and settles on filter 22 therefore, clean fluid is accessed by the squeegee 26 used by the service station customer. These advantages, cleaner washer fluid, continuous supply of washer fluid, and less frequent filling of dispenser 14 are important innovations.

Although the present invention has been described in considerable detail with reference to certain preferred versions thereof, other versions are possible. Reservoir 12 could be of a capacity more than or less than twice that of dispenser 14. Additionally the reservoir could include a float indicator means for signalling low fluid level within reservoir. Additionally, the impurity removing means could also be positioned within the reservoir 12. Further, filter 22 may be used without a fixed edge 60, 64 around either perimeter or opening. Therefore, the spirit and scope of the appended claims should not be limited to the description of the preferred versions contained herein.

What is claimed is:

1. A pump-free automobile window washer system for providing a continuous supply of window washer fluid for use with a window washing squeegee, comprising:

a reservoir, having a bottom and four sides and a lid;

at least one dispenser, having a bottom and four sides and a lid having an aperture formed therein for receipt of automobile window washing squeegee;

tubing in fluid communication with said reservoir and dispenser;

impurity removing means for cleaning the window washer fluid retained within said dispenser; and said impurity removing means further comprises a slotted platform, having a handle formed centrally thereof, positioned within said at least one dispenser.

2. The system of claim 1, further comprising at least one shut-off valve positioned on said tubing for temporarily stopping fluid flow between said reservoir and said at least one dispenser.

3. The system of claim 1, wherein said impurity removing means further comprises a filter, having an aperture formed therein for receiving said handle of said slotted platform, mounted on said slotted platform.

4. The system of claim 3, further comprising fastening means for attaching said filter to said slotted platform.

5. The system of claim 4, wherein said fastening means includes hook and loop type fasteners mounted on both said filter and said slotted platform.

6. The system of claim 3, further comprises a flange positioned adjacent side walls of said dispenser for supporting said slotted platform above the bottom of said dispenser.

7. The system of claim 6, further comprising additional dispensers, each in fluid communication with said reservoir with additional tubing, and additional outlet in reservoir, each having a shut-off valve.

8. A pump-free automobile window washer system for providing a continuous supply of window washer fluid for use with window washing squeegee, comprising:

a reservoir, having a bottom and four sides and a removable, lockable lid;

at least one dispenser, having a bottom and four sides and a lid having an aperture formed therein for receipt of automobile window washing squeegee;

tubing in fluid communication with said reservoir and dispenser, said tubing having at least one shut-off valve positioned on said tubing for temporarily stopping fluid flow between said reservoir and said at least one dispenser; and impurity removing means for cleaning the window washer fluid including a slotted platform, having a handle formed centrally thereof, positioned within said at least one dispenser and a filter, having an aperture formed therein for receiving said handle of said slotted platform for mounting on said slotted platform.

9. The system of claim 8, further comprising fastening means for attaching said filter to said slotted platform.

10. The system of claim 9, wherein said fastening means includes hook and loop type fasteners mounted on both said filter and said slotted platform.

11. The system of claim 8, further comprising a flange positioned adjacent side walls of said dispenser for supporting said slotted platform above the bottom of said dispenser.

\* \* \* \* \*